United States Patent [19]
Faust et al.

[11] Patent Number: 5,166,473
[45] Date of Patent: Nov. 24, 1992

[54] NAVAL ELECTRICAL POWER CABLE AND METHOD OF INSTALLING THE SAME

[75] Inventors: Howard C. Faust, Kinnelon; Nicholas Adams, Mahwah; Wesley R. Kegerise, II, Oakland, all of N.J.

[73] Assignee: The Okonite Company, Ramsey, N.J.

[21] Appl. No.: 644,940

[22] Filed: Jan. 23, 1991

[51] Int. Cl.⁵ ............................................... H01B 7/28
[52] U.S. Cl. .................... 174/23 R; 174/10; 174/24; 174/113 R
[58] Field of Search ............. 174/113 R, 23 R, 23 C, 174/24, 26 R, 10

[56] References Cited

U.S. PATENT DOCUMENTS

| | | | |
|---|---|---|---|
| 1,950,182 | 3/1934 | Kirch | 174/26 R |
| 1,969,764 | 8/1934 | Soutter, Jr. | 174/10 |
| 2,391,055 | 12/1945 | Komives et al. | 174/23 C |
| 3,236,939 | 2/1966 | Blewis et al. | 174/110 AR |
| 3,610,814 | 10/1971 | Peacock | 174/113 R |
| 3,710,007 | 1/1973 | Hoeg et al. | 174/113 R X |
| 3,830,953 | 8/1974 | Wood et al. | 174/23 C |
| 3,836,695 | 9/1974 | Strecker et al. | 174/23 C |
| 3,888,709 | 6/1975 | Burk | 174/116 X |
| 3,889,049 | 6/1975 | Legg et al. | 174/102 R |
| 4,038,489 | 7/1977 | Stenson et al. | 174/10 |
| 4,196,307 | 4/1980 | Moore et al. | 174/47 |
| 4,308,416 | 12/1981 | Herman et al. | 174/23 C |
| 4,319,074 | 3/1982 | Yaste et al. | 174/116 |
| 4,366,770 | 1/1983 | Eckstein et al. | 174/25 R X |
| 4,791,240 | 12/1988 | Marin et al. | 174/23 C |
| 4,941,932 | 7/1990 | John | 174/116 X |

OTHER PUBLICATIONS

Class 200 Fire Stop Products published by Nelson.

Product Data Sheets Section 8, Sheets 1 and 2 of the Okonite Company, Ramsey, N.J., May 1986.

*Primary Examiner*—Morris H. Nimmo
*Attorney, Agent, or Firm*—Hopgood, Calimafde, Kalil, Blaustein & Judlowe

[57] ABSTRACT

Naval power cable comprises a plurality of insulated electrical conductors, at least a pair of strip cords, a water blocking layer, and a jacket layer. Each electrical conductor has a longitudinal extent and is helically intertwined with the other electrical conductors, to form a core conductor assembly having at least a pair of outer interstices adjacent to the insulated electrical conductors. Each strip cord is disposed in and extends along one of the outer interstices of the core conductor assembly. The water blocking layer is disposed about the core conductor assembly and the strip cords, and prevents passage of water along interstices about the electrical conductors. The jacket layer is disposed over and adjacent to the water blocking layer. To provide a power cable construction which has superior physical strength, toughness and resistance to damage, the water blocking layer and jacket layers, are formed from first and second cross-linkable materials, respectively. Preferably, cross-linking is effected throughout the jacket layer, across the interface, and partially into the water blocking layer. Also disclosed is an improved method installing power cable of the present invention aboard naval vessels. The method ensures the formation of improved seals at cable transits, and permits installation of power cable aboard naval vessels with substantial savings in time and effort and added measures of worker safety.

17 Claims, 5 Drawing Sheets

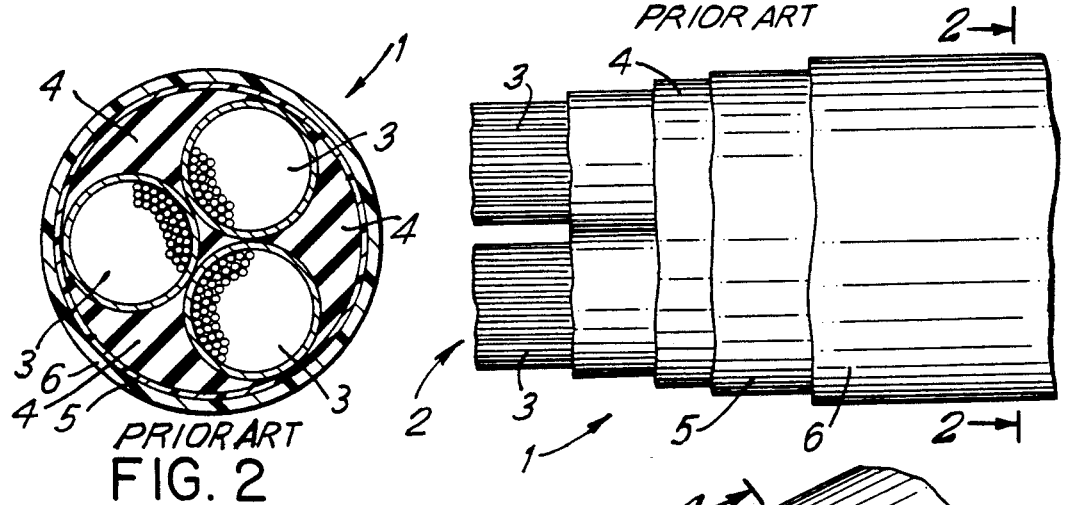
FIG. 1 PRIOR ART
FIG. 2 PRIOR ART
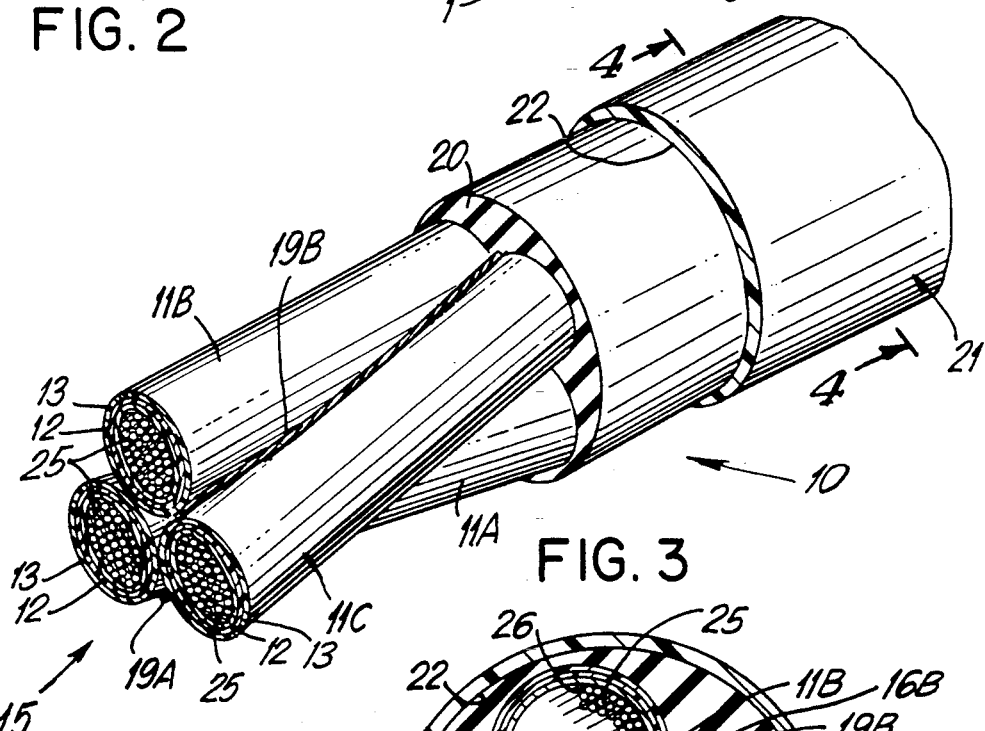
FIG. 3
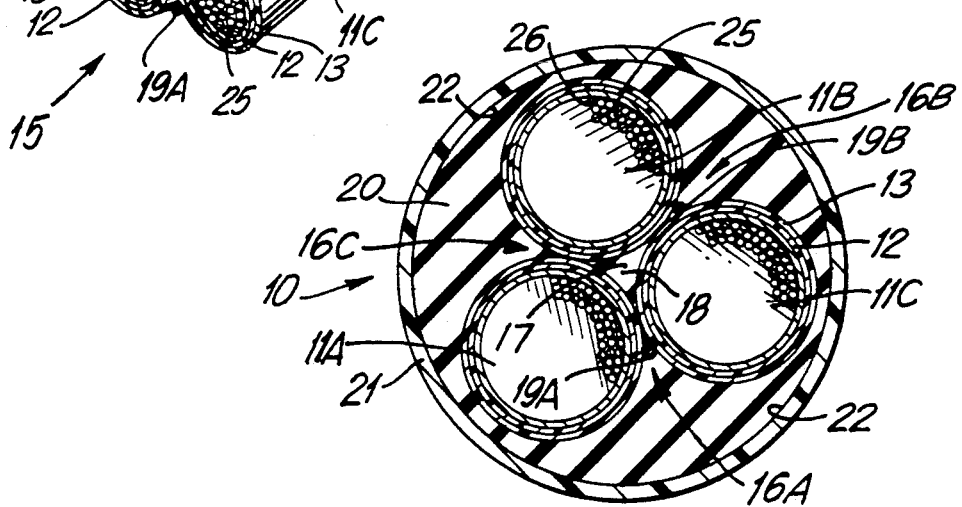
FIG. 4

NAVAL ELECTRICAL POWER CABLE AND METHOD OF INSTALLING THE SAME

FIELD OF INVENTION

The present invention concerns an electrical power cable for use in delivering power through one or more air and water tight compartments in naval vessels, and more particularly, concerns naval power cable which can be easily installed in the vessel with minimum damage to the outer jacket and at the same time be capable of forming improved seals at the interface of the outer jacket and water blocking cable transits in compartment walls.

BACKGROUND OF THE INVENTION

In Naval and other maritime vessels, such as aboard ships and submarines, there is a great need to deliver electrical power through spaced apart compartments, each of which can be independently sealed off in a water and air tight manner during emergency situations. Typically, an emergency situation aboard a naval vessel might be a fire in one or more compartments, or water leakage occurring therein, occasioned, for example, during battle.

During such emergency conditions, it is imperative that each compartment in which the emergency condition arises, be sealed off and contained from the rest of the ship. To ensure this, a number of measures are conventionally undertaken.

Firstly, naval power cable with water impenetrable blocking or filler material between the outer jacket and inner conductors, is generally used aboard such vessels. Secondly, electrical power cable extending through adjacent compartments is passed through water blocking cable transits, at which a water and air tight seal is sought between the transits and cable jacket. Thirdly, compartments aboard the vessel through which electrical power cable passes, are capable of being closed shut in a water and air tight manner during emergency situations.

In FIG. 1 of the drawings, a typical prior art multi-conductor power cable for use aboard naval vessels, is illustrated. In general, such prior art power cable 1 comprises a core conductor assembly 2 consisting of triplexed insulated conductors 3, a water blocking layer 4 extruded over the core conductor assembly, a non-uniform layer of binder tape 5 helically wound over the blocking layer, and a jacket layer 6 extruded over the binder tape, as shown.

While it has been possible to satisfy the general requirements of naval power cable, prior art naval power cable of the type described above has nevertheless suffered from several significant shortcomings and drawbacks.

Foremost, in order to expose the insulated electrical conductors for spreading and connection to electrical equipment in cable spreading rooms, large lengths of water blocking and jacket material must be stripped away to freely expose the core conductor assembly. With such prior art power cable, removal of the water blocking and jacket material requires cutting each layer away bit by bit using sharp cutting tools, the nature of which poses great safety hazards to shipyard workers. In addition to requiring arduous effort and numerous hours and sometimes a day or more to strip away the water blocking and jacket material, often the shipyard workers wielding the sharp cutting tools inadvertently cut into the core conductor assembly, damaging the electrical insulation on the conductors. Frequently, these workers also injure themselves in such prior art stripping operations. For example, workers can cut themselves with the sharp cutting tools. Also they are exposed to the risk of slipping and falling on rubber chips and shavings which fall to the vessel floor during cable stripping operations.

As illustrated in FIG. 1, prior art power cable has required the overlapping layer of binder tape to help shipyard workers determine the location of insulated electrical conductors, and to indicate where the blocking material begins and permit the shipyard workers to determine where the insulated conductors lie, in an effort to avoid damaging the electrical insulation during jacket and blocking material stripping operations.

Consequently, prior art naval power cable has been generally characterized by surface irregularities in the outer jacket layer due to the underlying helically wound binder tape hitherto required. These surface irregularities present difficulty in establishing high quality air and water seals desired at the interface of the cable outer jacket and cable transit sealing material. As a result, when a dozen or more of such prior art power cables pass through a cable transit, the risk associated with smoke and water leakage from one compartment to adjacent compartments, is greatly magnified during emergency situations.

Due to the presence of the overlapping binder tape between the water blocking and outer jacket layer, wrinkles often form in the outer jacket of prior art cable, as a result of cable bending motion naturally occasioned during installation (i.e., routing) of power cable, over cable support hangers, and through conduits and cable transits. Consequently, with such wrinkles, the risk of damage to the outer jacket of prior art naval power cable is substantially increased during the cable installation process.

Thus, there is a great need in the art to provide improved naval power cable and a method of installing the same without the accompanying shortcomings and drawbacks of the prior art.

Accordingly, it is a primary object of the present invention to provide a naval power cable which can be easily stripped of its water blocking material and outer jacket layer with a substantial reduction in stripping time and an added measure of safety.

Another object of the present invention is to provide such naval power cable, in which the inside surface of the outer jacket is more tenaciously bonded to the outside surface of the water blocking material than with the use of adhesives.

Another object of the present invention is to provide a naval power cable, in which the use of cable binder tape has been eliminated altogether, thereby resulting in a naval power cable having a substantially reduced overall diameter.

Another object of the present invention is to provide a naval power cable, in which the water blocking material and outer jacket layer are tenaciously bonded together and can be easily cut without the use of sharp cutting tools so that large lengths of power cable can be quickly and safely stripped aboard a naval vessel, by simply peeling away at most a few integrally bonded strips of water blocking and jacket material.

Another object of the present invention is to provide such naval power cable, in which, the outer jacket is essentially resistant to wrinkling when manipulated during the installation aboard a ship or like naval vessel.

Another object of the present invention is to provide such naval power cable, in which the outer jacket remains essentially uniform over its surface characteristics during installation and while embraced within the sealing material of cable transits, so as to provide improved water and air seals therebetween when subjected to hydrostatic pressures and smoke typically presented during emergency situations.

Yet a further object of the present invention is to provide a novel method of installing electrical power cable through isolatable compartments aboard a naval vessel, in a manner which reduces cable stripping time and provides an additional measure of shipyard worker safety.

An even further object of the present invention is to provide a simpler method of manufacturing such shipboard power cable.

These and other objects will become apparent hereinafter and in the claims.

SUMMARY OF INVENTION

According to one aspect of the present invention, electrical power cable is provided for use in distributing electrical power aboard a naval vessel.

In general, the naval power cable comprises a plurality of insulated electrical conductors, at least a pair of strip cords, a water blocking layer, and a jacket layer. Each electrical conductor has a longitudinal extent and is helically intertwined with the other electrical conductors, to form a core conductor assembly having at least a pair of outer interstices adjacent to the insulated electrical conductors. Each strip cord is disposed in and extends along one of the outer interstices of the core conductor assembly. The water blocking layer is disposed about the core conductor assembly and the strip cords, and prevents passage of water along interstices about the electrical conductors. The jacket layer is disposed over and adjacent to the water blocking layer and is physically associated therewith.

In the preferred embodiment, the water blocking layer is formed of a first cross-linkable material, and the jacket layer is formed of a second cross-linkable material. To provide tenacious covalent bonding between the jacket and water blocking layer materials, these materials are preferably cross-linked across the interface therebetween.

According to another aspect of the present invention, a novel method of installing the naval power cable hereof is also provided.

In general, the method involves providing naval power cable of the type described above. This naval power cable is then passed through cable transits in compartments aboard the vessel. Thereafter, each cable transit is packed or assembled to provide a water and air tight seals between the jacket layer of the cable and the transit sealing material of each transit. In the cable spreading compartment, a predetermined length of water blocking layer and the jacket layer are removed. In accordance with the present invention, such material is removed by first exposing a portion of each strip cord. Then, each strip cord is gripped with a tool, preferably blunt and having a longitudinal extent. The tool is then manually gripped and pulled, thereby pulling the strip cord longitudinally along the power cable to simultaneously cut the jacket layer and the water blocking layer, and form two or more strip-like layers of jacket layer and water blocking material. Thereafter, each strip-like layer is peeled away from the underlying core conductor assembly to expose the insulated conductors for spreading and connection to equipment of various types.

As a result of the naval power cable of the present invention, improved seals can now be formed at cable transits in vessel compartments. In addition, it is now possible to install such power cable aboard naval vessels with substantial savings in time and effort and added measures of worker safety.

BRIEF DESCRIPTION OF DRAWINGS

For a further understanding of the objects of the present invention, the detailed description of the illustrated embodiments is to be taken in connection with the following drawings, in which:

FIG. 1 is an elevated, partially broken away side view of the prior art naval power cable;

FIG. 2 is a cross-sectional view of prior art naval power cable, taken along line 1-2 of FIG. 1;

FIG. 3 is a perspective, partially broken away view of naval power cable constructed in accordance with the principles of the present invention;

FIG. 4 is a cross-sectional view of naval power cable of the present invention, taken along line 4—4 of FIG. 3;

DETAILED DESCRIPTION OF THE ILLUSTRATED EMBODIMENT

Figure 5:
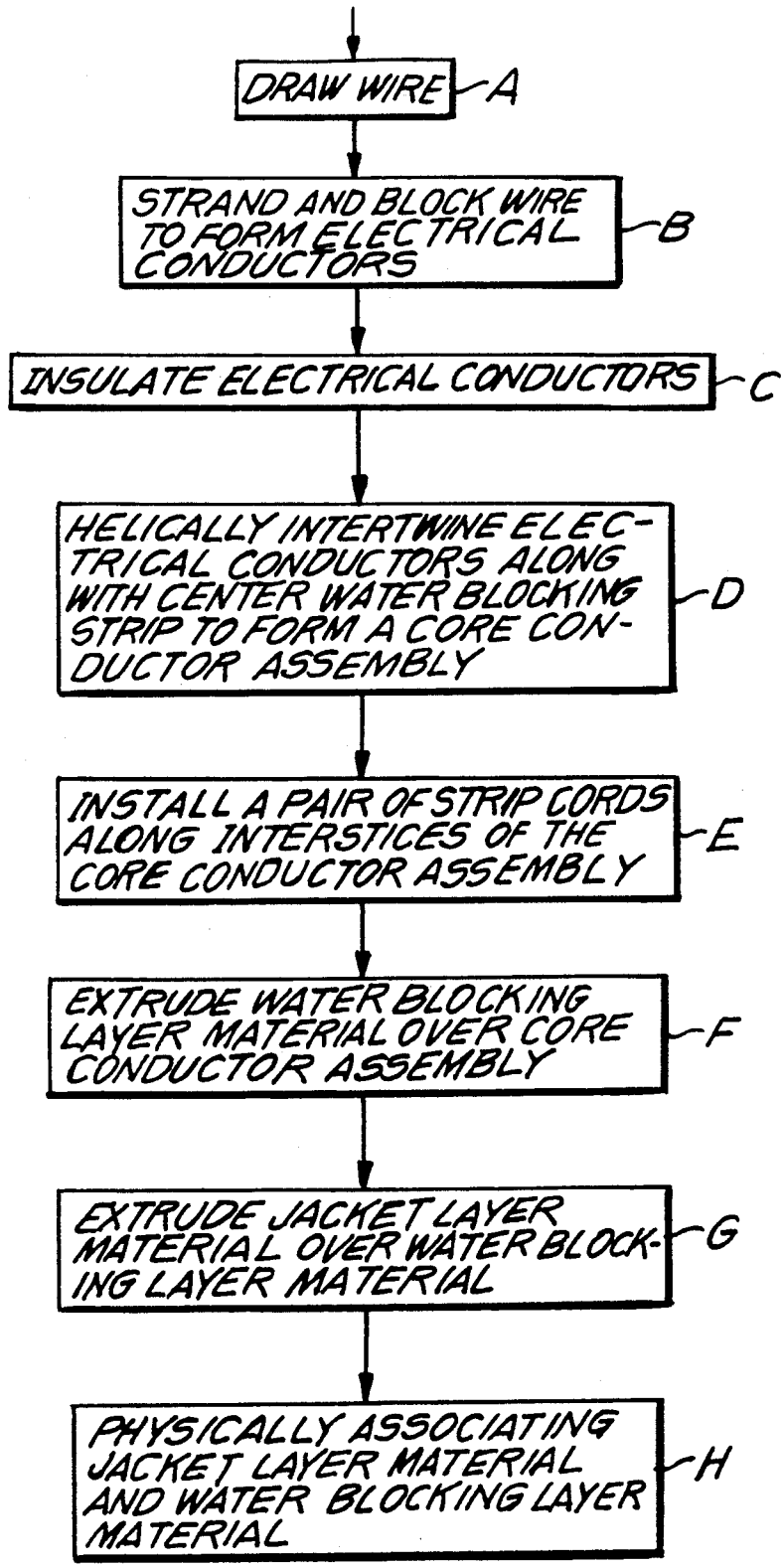
FIG. 5 is a block functional diagram illustrating the method of manufacturing the naval power cable of FIGS. 3 and 4 in accordance with the present invention.

In the illustrated embodiment of the present invention, generally shown in FIGS. 3 through 11, power cable 10 comprises three electrical conductors 11A, 11B and 11C, having a longitudinal extent and being insulated by first and second layers 12 and 13 of insulation material. Notably, however, in accordance with the principles of the present invention, the naval power cable may include a number of electrical conductors other than three. As shown the electrical conductors are helically intertwined with each other so as to form a core conductor assembly, generally indicated by reference number 15.

As illustrated in FIGS. 3 and 4, core conductor assembly 15 has three outer interstices, indicated by reference numerals 16A, 16B and 16C, which are adjacent to the electrical conductors. Also, core conductor assembly 15 has one inner interstice 17 bounded by insulated conductors 11A, 11B and 11C, as shown. Inner interstice 17 is filled with a center water block strip 18, compressed between the helically intertwined insulated conductors.

In and along the entire longitudinal extent of outer interstices 16A and 16B, strip cords 19A and 19B are disposed. Each strip cord 19A and 19B preferably comprises high tensile strength cord, such as cord made from fibers commercially available under the tradename Kevlar ®. Preferably, these strip cords are made with brightly colored pigments, which can be easily discerned against the naval power cable.

Disposed over and about core conductor assembly 15 and strip cords 19A and 19B, is a water blocking layer 20 formed from a first cross-linkable material and having a generally cylindrical outer surface geometry. The function of water blocking layer 20 is to prevent passage of water along the interstices about the insulated electrical conductors. Disposed directly over and adjacent to water blocking layer 20 is an outer jacket layer 21, which is formed from a second cross-linkable material. As will be described in greater detail hereinafter, jacket layer 21 preferably is covalently bonded to water blocking layer 20 across the interface 22 therebetween. Such covalent bonding is achieved by cross-linking the water blocking layer and jacket layer materials at the interface 22, in particular.

As illustrated in FIG. 5, naval power cable 10 of the illustrated embodiment can be manufactured by the process described below.

As indicated at block A, the first step of the process involves drawing wire 25 for each electrical conductor. While, this step is achieved by drawing copper wire strands using techniques well known in the art, other conductive materials can, of course, be utilized with expectedly good results.

As indicated at block B, a plurality of drawn copper wires 25 are then stranded together in a conventional manner to form electrical conductors 11A, 11B and 11C. Then, interstices 26 amongst strands 25 are filled with mastic material during the blocking process. This filler material functions to block off interstices 26 from the passage of water and gases.

Subsequently, as indicated at block C, these electrical conductors are then covered with layers of insulative material. Preferably, the first layers of insulative material 12 are silicone glass tape and the last overlapping layer 13 is polyester tape. Such insulative layers can be applied to stranded and blocked electrical conductors in a conventional manner well known in the art.

As illustrated at block D, the electrical conductors formed during steps A through C, are helically intertwined along with center blocking strip 18 deposited along the longitudinally extending inner interstice 17, to thereby form core conductor assembly 15. In such a state, center blocking strip 18 is greatly compressed to fill or otherwise occlude a substantial portion of inner interstice 17.

Then, as indicated at block E, the process involves installing a pair of Kevlar ® strip cords along outer interstices 16A and 16B, respectively, of the core conductor assembly.

Water blocking layer material 20 is then extruded over core conductor assembly 15 and installed strip cords 16A and 16B, as indicated at Block F. Over the water blocking layer material 20, jacket layer material 21 is extruded, as indicated at block G. Preferably, both the water blocking layer and outer jacket layer are simultaneously extruded using co-extrusion process technology known in the art.

The first and second materials utilizable in forming the water blocking layer and the outer jacket layer, respectively, will be considered below.

In the preferred embodiment, the first and second materials are both suitably made from the same or different polyolefins. The polyolefins may be present as homopolymers or copolymers, including various regularly repeating copolymers, terpolymers, block copolymers, and the like. The first material may also be a polymer blend.

Suitable monomers from which the polyolefin of the first and/or second material are derived include ethylene, propylene, vinyl acrylate, methyl acrylate, ethyl acrylate, acrylic acid, other α-olefins, diolefins, and other polyolefinic monomers and oligomers.

Exemplary polyolefins include homopolyolefins such as polyethylene, polypropylene, and other α-olefin homopolymers.

Other exemplary polyolefins include copolyolefins such as ethylene/vinyl acetate (EVA), ethylene/methyl acryate, ethylene/ethyl acrylate, ethylene/acrylic acid, ethylene/propylene copolymer (ethylene/propylene rubber, also known as EPR), and other α-olefin/ethylene copolymers.

Still other exemplary polyolefins include terpolymers such as ethylene/propylene/diene monomer (EPDM) containing not more than about 10% by weight of the diolefin. Representative diolefins include dycylo pentadiene, 1,4-hexadiene and ethylidene norbornene.

The first material may also be a polymer blend, preferably a blend of polyolefins including those such as the homopolyolefins, copolyolefins, and terpolyolefins as described previously. As is recognized in the polymer art, it is preferred to blend compatible polymers. Accordingly, a preferred polymer blend is a blend of EPR and EPDM, most preferably wherein the EPDM comprises from about 25% to about 65% of the total blended polymers in the composition. Also preferred is a blend of ethylene/vinyl acetate copolymer and ethylene/propylene/1,4-hexadiene terpolymer. In general, suitable polymer blends include blends containing two or more of the polyolefins described above. Suitable blends also include any of the foregoing polyolefins blended with chlorinated polyethylene, chlorosulfonated polyethylene, or butadiene acrylonitrile copolymer.

Any of the above polymers or blends may optionally include one or more colorants, fillers, curatives, fire retardants, plasticizers, anti-oxidants, or other conventional additives. Also, a free radical initiator is included in the composition, most preferably one which is thermally initiated. Conventional initiators include organic peroxides (such as di-cumyl peroxide) or hydroperoxides, or azo or diazo compounds, which generate suitable free radicals upon thermal or photochemical decomposition. Alternatively, the polyolefin can be cured using radiation.

In the present invention, specifically preferred embodiments include a first material comprising a blend of EPDM and EPR or a blend of EVA and ethylene-/propylene/1,4-hexadiene terpolymer, and a second material include EVA copolymer.

Either or both of the first and second materials may be cross-linked. Further, because the first and second materials are in direct contact, cross-linking can be achieved across their interface 22. This interfacial cross-linking can be facilitated by including an initiator such as di-cumyl peroxide in the second, jacketing material. After the first and second materials are formed into the desired configuration where the materials are in direct contact, some of the di-cumyl peroxide will diffuse across interface 22, from second material 21 into first material 20. Thereafter, sufficient heat to decompose the initiator and/or radiation is applied to begin cross-linking. Because the initiator is now present in both the first and second materials, and because both materials are in direct contact, cross-linking can be achieved completely through the second material, across interface 22, and partially through the first material 20. The interfacial cross-linking will provide a stronger and more water-resistant bond between the jacket layer and the water blocking layer. In addition, such cross-linking across the jacket and interface 22 and into the water blocking layer, provides a composite jacket and water blocking system which is physically stronger than conventional jackets and thus is more rugged and resistant to damage during cable installation.

In the alternative embodiment, the first and second materials forming the water blocking and jacket layers, respectively, may be physically associated by the use of rubber-to-rubber adhesives of the type, for example, commercially available from the Thixon Corporation. In yet another embodiments, the second material can be physically associated with the first material by simply extruding the second material over the first material.

Referring to FIGS. 6 through 11, the method of installing the naval power cord hereof in accordance with the present invention, will now be described.

Figure 6:
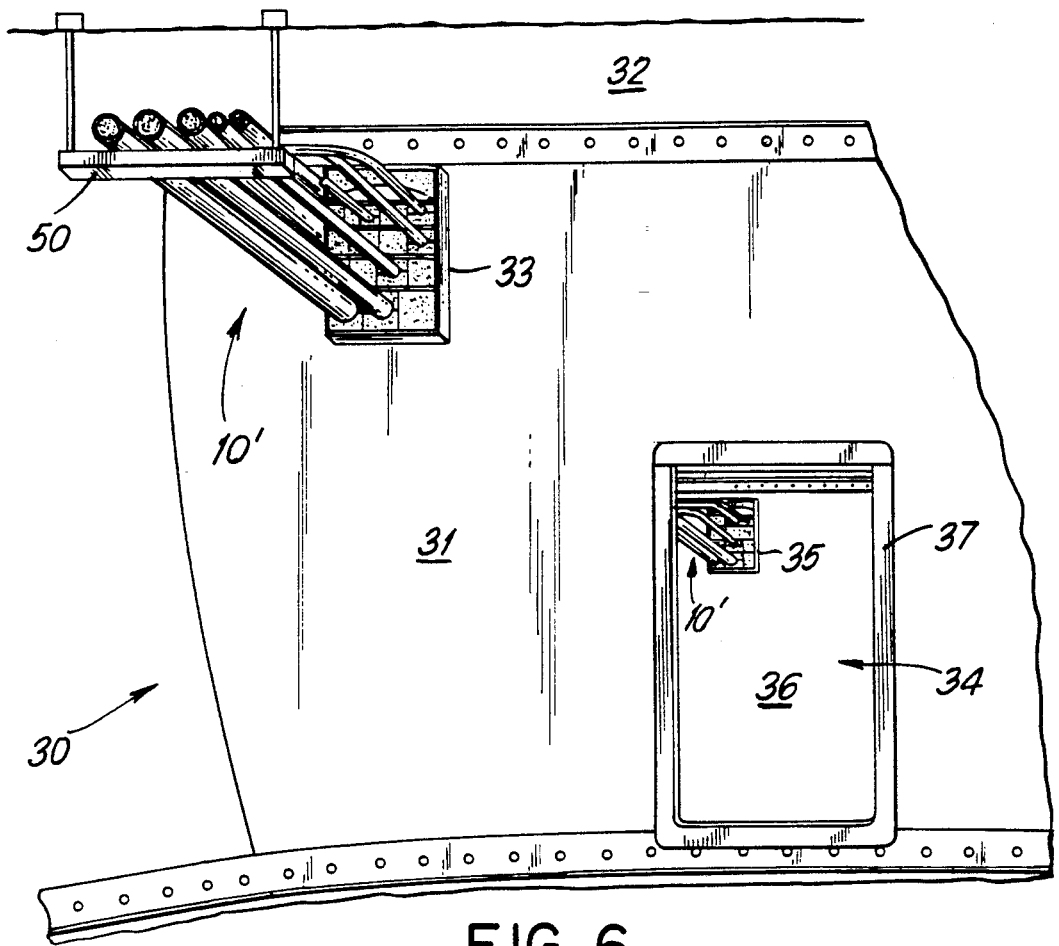
FIG. 6 is a perspective view aboard a naval vessel, showing an isolatable compartment in whose wall a cable transit is installed for permitting passage of a plurality of naval power cables of the present invention, while maintaining air and water tight seals between each power cable and cable transit sealing modules.
Figure 8:
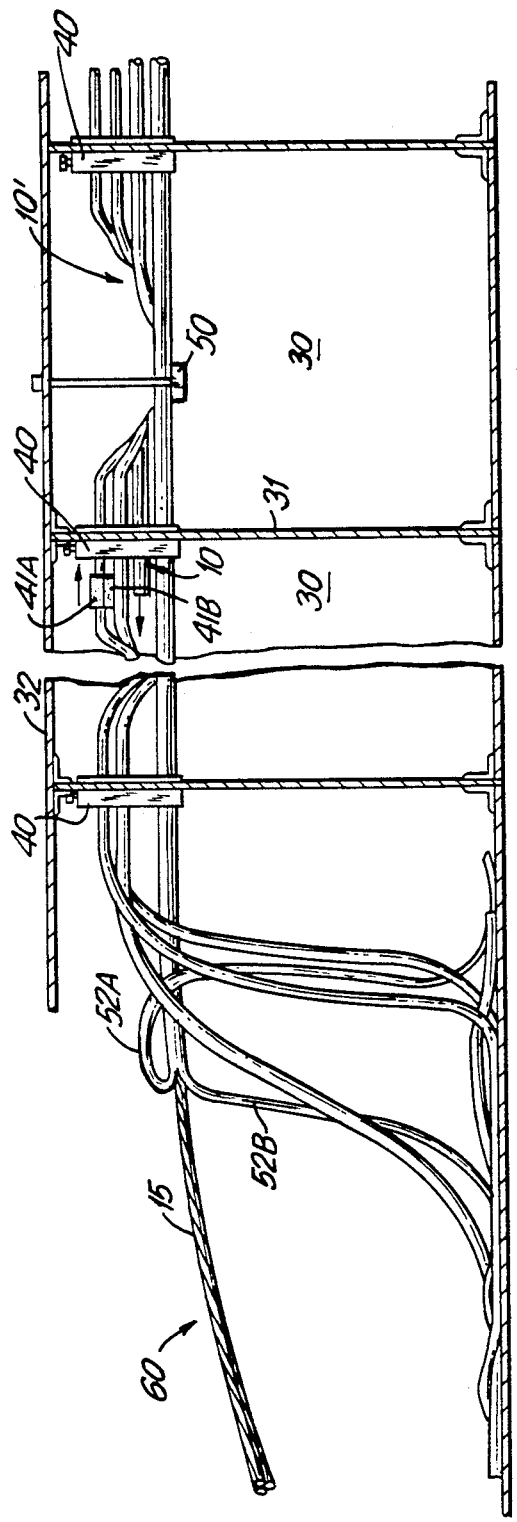
FIG. 8 is an elevated view of a portion of a naval vessel, showing several compartments and a cable spreading room through which power cable is installed in accordance with the method of the present invention.

In FIG. 5, an isolatable compartment 30 in a naval vessel is illustrated. As used hereinafter and in the claims, the term "compartment" shall include isolatable compartments, passageways, cabins, cabinets, cable splicing rooms and any other spaces along which power cable may be passed in a vessel. In wall 31 of the compartment, up near ceiling 32, a conventional multi-cable transit 33 is installed through a suitably formed aperture. Through cable transit 33 in compartment wall 31, a plurality of naval power cables 10' of various sizes are shown to pass. These naval power cables then continuously extend in an adjacent compartment 34, and pass through another cable transit 35 in wall 36. Within such compartment, the power cables 10' are typically suspended by a horizontal cable support rack 50, hung from compartment ceiling 32, as illustrated in FIGS. 6 and 8.

Also formed in compartment wall 31 is a hatch 37 which can be closed shut in a water and air tight manner during an emergency condition. Naval cables 10' continue to pass through a number of other compartments, or vessel spaces, until the power cables eventually terminate in what is often referred to as a cable spreading room. In such type of compartment, large lengths of jacket layer material and water blocking layer material must be removed to expose the electrical conductors, that is, for subsequent connection to electrical equipment of various types.

Figure 7:
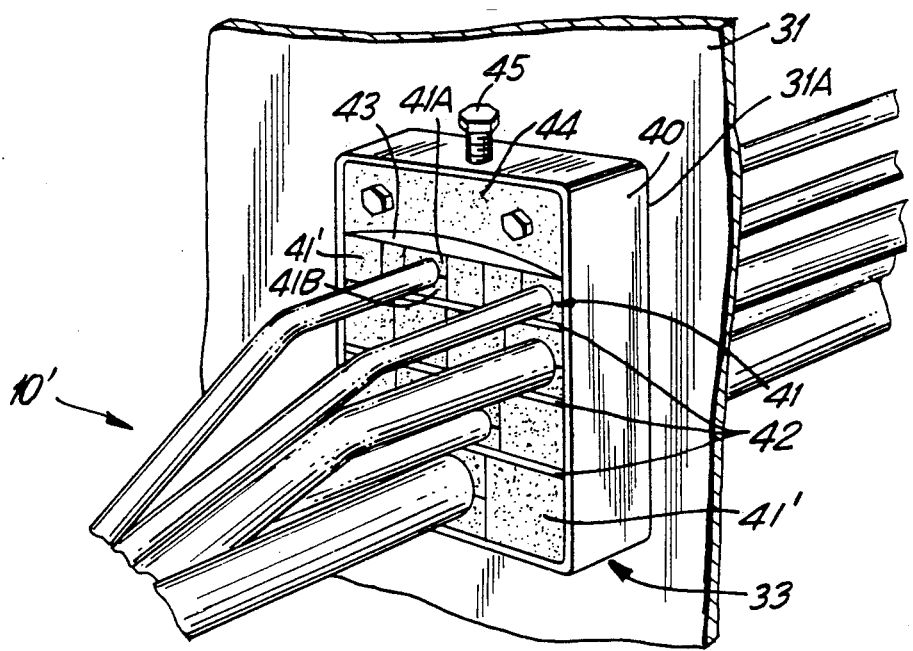
FIG. 7 is a perspective view of a cable transit for use with the naval power cable of the present invention.
Figure 10:
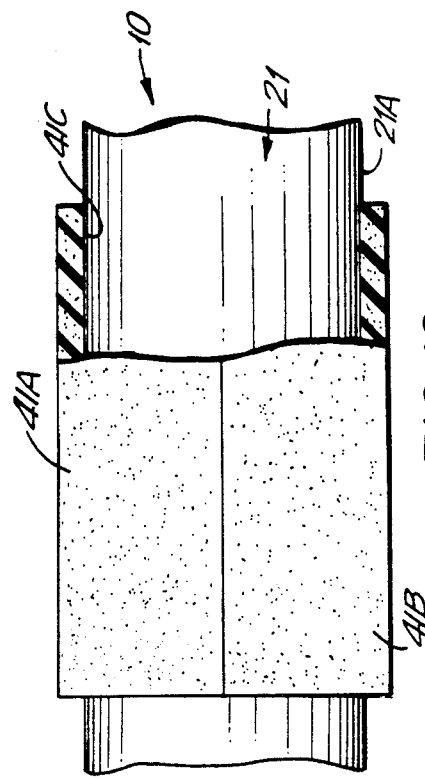
FIG. 10 is an elevated, partially broken away view of the cable transit sealing module and naval power cable shown in FIG. 9.
Figure 9:
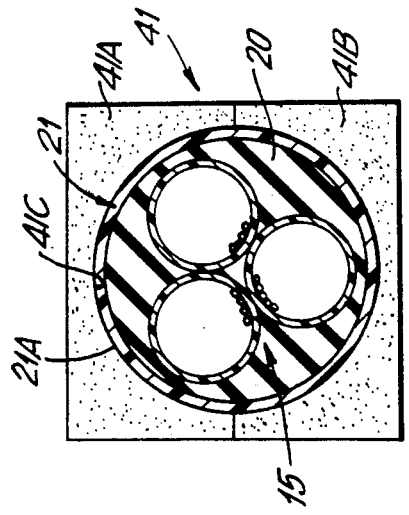
FIG. 9 is a cross-sectional view of a transit sealing module, in which naval power cable is compressively embraced to provide a high quality water and air tight seals between each sealing module bearing surface and the outer surface of the power cable jacket.

As shown in greater detail in FIGS. 7, 9 and 10, cable transit 33 comprises a transit frame 40, a number of transit sealing insert modules 41, 41', stay plates 42, a compression plate 43, end packing assembly 44 and a compression bolt 45. Transit frame 40 is typically welded through a suitable aperture 41 formed in compartment wall 31. Each insert module 41, 41' comprises a rectangular shaped block of resilient elastomeric material, having a bore formed centrally therethrough. As shown, the insert modules are available in a number of sizes to accommodate a range of naval cable outer diameters. Some insert modules 41', are solid modules and are used to fill voids or allow for future addition of naval cables. As each insert module is split into half sections 41A and 41B, they can be fitted snugly around naval cable 10 to form an air-tight and water-tight seal when compression is applied in final assembly step.

As shown, each insert module is horizontally stacked along the transit frame. Between each stack of insert modules, stay plate 42 is installed to help distribute compression forces within the transit frame and to keep insert modules from dislodging under high pressure conditions. Above the rectangular array of stacked insert modules, some of them having naval power cables passing through the bores thereof, compression plate 43 and end packing assembly 44 are installed. Compression bolt 45 passes through transit frame 40 and is threaded into each packing assembly 44 to apply pressure to the compression plate, sealing the bored insert modules around the naval power cables. A multi-cable transit of the type described above is commercially available from Nelson Electric.

Referring to FIGS. 8 and 9, in particular, steps of installing naval power cable 10 are more clearly illustrated. First a number of naval power cables 10' are passed through the central openings of transit frames 33. This step is achieved by pulling and dragging over cable support frames 50 the free end of naval power cable 10 through the opening in each cable transit. Then, insert modules halves 41A and 41B are slid about the jacket layer of the cable, and then brought together to form the rectangular module. This module is then slidably inserted within a selected opening provided within the transit frame. This process is continued for each naval power cable extending through each transit. When all necessary bored insert modules 41 and solid insert modules 41' are stacked in an arrayed manner within the transit frame, compression bolt 45 is tightened, compressing each insert module against the outer jacket layer of each naval power cable. In a compressed state illustrated in FIGS. 9 and 10, the smooth inner bearing surface 41C of each module bore continuously and smoothly engages the uniformly continuous outer surface 21A of jacket layer 21, to provide an improved seal against water and smoke present during emergency conditions.

Figure 11:
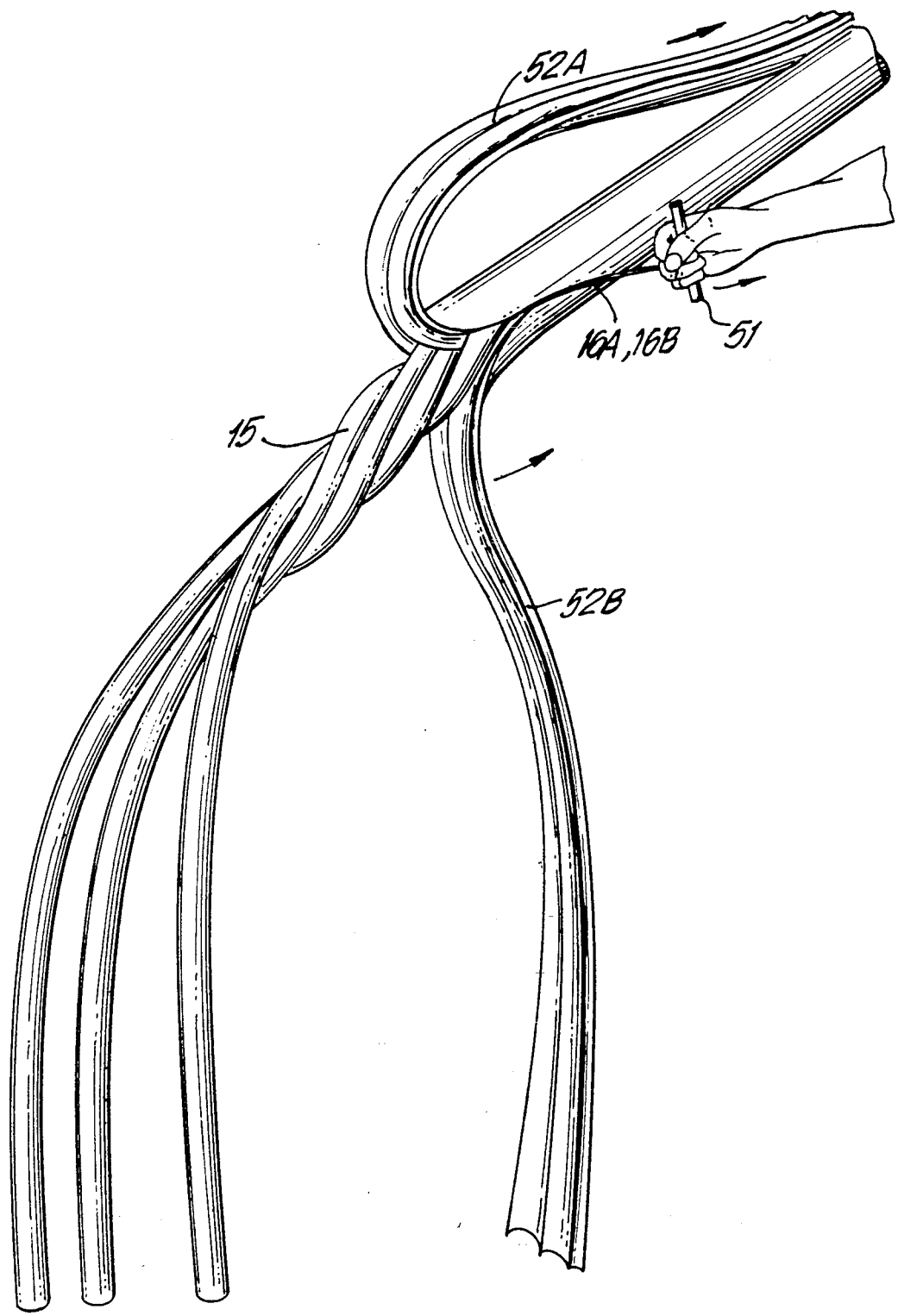
FIG. 11 is a perspective view of a length of power cable in the cable spreading room of FIG. 8, in which the water blocking and jacket material is being manually removed from about the core conductor assembly, in accordance with the method of the present invention.

After each cable transit is packed or otherwise assembled as described above, a predetermined length of the water blocking material and the jacket layer must be removed which, in the present illustration of FIGS. 8 and 11, occurs in the terminal compartment 60, typically referred to as the cable splicing room.

As illustrated in FIG. 11, this step involves first exposing a portion of each brilliantly colored strip cord 16A and 16B, by for example carving away a small portion of the outer jacket to expose an inch or so of each strip cord. Then by pulling on the strip cord with a gripping device, such as pliers, in the longitudinal direction, the strip cords will cut into and slice the integrally bonded jacket and water blocking material. When a few inches of strip cord are exposed, then this exposed strip cord can be wrapped around a blunt tool such as a dowel or metal rod 51 to effectively grip the same. Thereafter, the blunt tool can be manually gripped as shown in FIG. 11, and pulled along the longitudinal extent of the naval power cable, up to the desired predetermined length. This pulling action on each of the Kevlar ® cords, at about 180° apart from each other, simultaneously cuts the covalently bonded jacket layer and water blocking layer, into two strip-like layers 52A and 52B as shown. These strip-like layers can then be peeled backwardly in the direction of the unexposed power cable to expose the insulated conductors 11A, 11B and 11C for subsequent spreading and interconnection to power equipment and the like. Notably, the cut and peeled away jacket and water blocking material results in integrally connected strips of material, which facilitate the peeling procedure and substantially simplify the clean up of removed jacket and water blocking material aboard the naval vessel.

While the particular embodiments shown and described above have proven to be useful in many applications in the naval power cable art, further modifications of the present invention herein disclosed will occur to persons skilled in the art to which the present invention pertains, and all such modifications are deemed to be within the scope and spirit of the present invention defined by the appended claims.

What is claimed is:

1. Electrical power cable for use in distributing electrical power aboard a naval vessel, said electrical power cable comprising:
   a plurality of insulated electrical conductors each having a longitudinal extent and being helically intertwined with the other of said electrical conductors so as to form a core conductor assembly having at least a pair of outer interstices adjacent said insulated electrical conductors;
   a water blocking layer disposed about said core conductor assembly so as to prevent passage of water along said interstices about said electrical conductors;
   a jacket layer disposed over and adjacent said water blocking layer so that said jacket layer is physically associated with said water blocking layer; and
   at least a pair of strip cords, each said strip cord being disposed in and along one said outer interstice of said core conductor assembly, so that when each said strip cord is pulled along the longitudinal extent of said insulated electrical conductors, said pulled strip cord cuts both said water blocking layer and said jacket layer.

2. The electrical power cable of claim 1, wherein said water blocking layer is partially cross-linked.

3. The electrical power cable of claim 1, wherein said jacket layer is cross-linked.

4. The electrical power cable of claim 1, wherein said water blocking layer is cross-linked to said jacket layer.

5. The electrical power cable of claim 1, wherein each said strip cord comprises high tensile strength fibers.

6. Electrical power cable for use in distributing electrical power aboard a naval vessel, said electrical power cable comprising:
   a plurality of insulated electrical conductors each having a longitudinal extent and being helically intertwined with the other of said electrical conductors so as to form a core conductor assembly having at least a pair of outer interstices adjacent said insulated electrical conductors;
   at least a pair of strip cords, each said strip cord being disposed in and extending along one said outer interstice of said core conductor assembly;
   a water blocking layer disposed about said core conductor assembly and said strip cords so as to prevent passage of water along said interstices about said electrical conductors; and
   a jacket layer disposed over and adjacent said water blocking layer so that said jacket layer is physically associated with said water blocking layer; wherein said water blocking layer is formed of a first cross-linkable material, said jacket layer is formed of a second cross-linkable material and said jacket layer is covalently bonded to said water blocking layer, and wherein each said strip cord comprises high tensile strength fibers.

7. The electrical power cable of claim 6, wherein both said first material and said second material are polyolefins.

8. The electrical power cable of claim 7, wherein the first material is a polymer blend.

9. The electrical power cable of claim 7, wherein at least one of said first and second materials is derived from at least one monomer selected from the group consisting of ethylene, propylene, vinyl acetate, methyl acrylate, ethyl acrylate, acrylic acid, α-olefins, and diolefins.

10. The electrical power cable of claim 9, wherein at least one of said first and second materials is a copolymer selected from the group consisting of ethylene/vinyl acetate, ethylene/methyl acrylate, ethylene/ethyl acrylate, ethylene/acrylic acid, and ethylene/propylene.

11. The electrical power cable of claim 9, wherein at least one of said first and second materials is a terpolymer of ethylene, propylene, and not more than about 10 wt. % of a diolefin.

12. The electrical power cable of claim 8, wherein said polymer blend includes at least one polyolefin derived from one or more monomers selected from the group consisting of ethylene, propylene, vinyl acetate, methyl acrylate, ethyl acrylate, acrylic acid, α-olefins, and diolefins.

13. The electrical power cable of claim 8, wherein said polymer blend includes a polyolefin blended with at least one of chlorinated polyethylene, chlorosulfonated polyethylene, and butadiene acrylonitrile copolymer.

14. The electrical power cable of claim 7, wherein said first material is a polymer blend of ethylene propylene diene terpolymer (EPDM) and ethylene propylene rubber (EPR) or a blend of EVA and EPR, and said second material is ethylene vinyl acetate copolymer (EVA).

15. The electrical power cable of claim 6, wherein said first cross-linkable material is partially cross-linked.

16. Electrical power cable for use in distributing electrical power aboard a naval vessel, said electrical power cable comprising:
   a plurality of insulated electrical conductors each having a longitudinal extent and being helically intertwined with the other of said electrical conductors so as to form a core conductor assembly having at least a pair of outer interstices adjacent said insulated electrical conductors;

at least a pair of strip cords, each said strip cord being disposed in and extending along one said outer interstice of said core conductor assembly;

a water blocking layer formed of a first cross-linkable material disposed about said core conductor assembly and said strip cords so as to prevent passage of water along said interstices about said electrical conductors; and a jacket layer formed of a second cross-linkable material disposed over and adjacent said water blocking layer so that said jacket layer is physically associated with said water blocking layer, wherein said second cross-linkable material is cross-linked.

17. Electrical power cable for use in distributing electrical power aboard a naval vessel, said electrical power cable comprising:

a plurality of insulated electrical conductors each having a longitudinal extent and being helically intertwined with the other of said electrical conductors so as to form a core conductor assembly having at least a pair of outer interstices adjacent said insulated electrical conductors;

at least a pair of strip cords, each said strip cord being disposed in and extending along one said outer interstice of said core conductor assembly;

a water blocking layer formed of a first cross-linkable material disposed about said core conductor assembly and said strip cords so as to prevent passage of water along said interstices about said electrical conductors; and a jacket layer formed of a second cross-linkable material disposed over and adjacent said water blocking layer so that said jacket layer is physically associated with said water blocking layer, wherein said first cross-linkable material is cross-linked to said second cross-linkable material.

* * * * *